United States Patent [19]

Matsumura

[11] 3,827,565
[45] Aug. 6, 1974

[54] METHOD AND DEVICE OF ARTIFICIAL ENDOCRINE PANCREAS

[76] Inventor: Kenneth N. Matsumura, P.O. Box 1249, Berkeley, Calif. 94701

[22] Filed: May 16, 1973

[21] Appl. No.: 360,981

Related U.S. Application Data

[62] Division of Ser. No. 888,733, Dec. 29, 1969, Pat. No. 3,734,851.

[52] U.S. Cl. ............................... 210/22, 210/321
[51] Int. Cl. ....................... B01d 31/00, B01d 13/00
[58] Field of Search ............................ 210/22, 321

[56] References Cited
UNITED STATES PATENTS
3,608,729   9/1968   Haselden ........................... 210/321

*Primary Examiner*—Frank A. Spear, Jr.
*Attorney, Agent, or Firm*—Warren, Rubin & Chickering

[57] ABSTRACT

A method for treating and changing the constitution of blood or other body fluid as the pancreatic islet cells effects such change normally in the blood or other body fluid passing therethrough in a live animal, in cooperation with or substitution for the animal endocrine pancreas; and a device for carrying out such treatment. The method comprises positioning on one side of a semi-permeable membrane and in contact therewith body fluid to be treated and the positioning on the opposite side of the membrane and proximate therewith once dispersed live pancreatic islet cells. The device comprises means associated with the membrane for positioning body fluid in contact with one side of the membrane, conduit means for introducing such fluid to and withdrawing it from the membrane, and once dispersed live pancreatic islet cells disposed on the other side of the membrane out of direct contact with the fluid. Additionally, the device may have a second membrane for dialyzing the fluid.

12 Claims, 4 Drawing Figures

METHOD AND DEVICE OF ARTIFICIAL ENDOCRINE PANCREAS

This application is a division of Application Ser. No. 888,733 filed on Dec. 29, 1969 now U.S. Pat. No. 3,734,851.

This invention relates to a method for treating and changing the constitution of blood or other body fluid as the pancreatic islet cells effects such change normally in the blood passing therethrough in a live animal and it particularly concerns an artificial endocrine pancreas.

The value of an artificial endocrine pancreas to substitute or supplement the natural one in a diabetic has been recognized for years. According to the Bedford survey, there are over 200 million diabetics in the world. It is estimated that there are over four million diabetic Americans. Thirty percent of diabetics are of juvenile-onset type which is a more severe form requiring insulin treatments. Tens of thousands of patients annually are hospitalized into the Intensive Care Units near death in diabetic hyperglycemia coma. Such a comatose state results from miscalculated self-administration of insulin. Current management of diabetic coma is to repeatedly administer insulin and potassium ion, basing their dosage on frequent serial determination of patient's blood glucose and electrolytes. Such a management is tedious and carries high risks for making fatal errors. It would be preferable to hook up such patients temporarily via an extracorporeal circuitry to a device which can continuously monitor blood glucose and release into the blood stream correct amounts of insulin. It would be of additional benefit if such a device can also correct electrolyte imbalance which is also present in such comatose patients. I have succeeded in developing a method and device for effecting such functions, which make use of once dispersed living pancreatic islet cells incorporated in a housing of suitable synthetic materials. An artificial pancreas had been long sought. Past failure to develop one has been due to the fact that attempts have been aimed at creating an entirely artificial device. I have overcome these difficulties by partly using natural components.

Briefly the method of the present invention comprises the positioning on one side of a semi-permeable membrane and in contact therewith body fluid to be treated and the positioning on the opposite side of the membrane and proximate therewith once dispersed live pancreatic islet cells. The device of the present invention comprises means associated with the membrane for positioning body fluid in contact with one side of the membrane, conduit means for introducing such fluid to and withdrawing it from the membrane, and once dispersed live pancreatic islet cells disposed on the other side of the membrane out of direct contact with the fluid.

Preferably a second semi-permeable membrane is used to dialyze such body fluid. This second membrane is desirably positioned such that its relationship to the first membrane is to sandwich the layer of the aforementioned pancreatic material, and dialysate liquid is flowed over the second membrane out of contact with the blood and the cells. In this manner, glucose in the blood passes through the first membrane, enabling the cells to sense the blood glucose level. Cells then release insulin and other desirable products into the blood stream across the first membrane. The amount of insulin released is dependent on the blood glucose level. As insulin enters the animal thereby lowering blood sugar level, hypokalemia (low level of blood potassium ion) develops. However, potassium ions in the dialysate liquid pass through the device to enter the blood stream because of the diffusion gradient that develops between the higher concentration of potassium ions in the dialysate liquid and the lower concentration in the blood.

The first membrane, which is in contact with the blood, is of such type as to allow passage of molecules, but most preferably in an advantageous embodiment is not permeable to cells. It prevents entry into the pancreatic cell layer of immunological cells in blood which could otherwise destroy the pancreatic cells when genetic histo-incompatibility exists between the pancreatic cells and the animal being treated, and it also prevents the loss of pancreatic cells into the blood. Suitably, such first membrane allows optimum passage of molecules of great divergency in size, shape, and electrical charge, such as protein (e.g., insulin), glucose, etc. Such membrane, for example, can be of membrane type filter such as Millipore Filter MF (made of mixed esters of cellulose) HAW, having a porosity or average pore size of about 0.45 microns, which is well known and has a high flow rate and well-defined porosity. Other types of membranes (e.g., other Millipore Membranes) may be found to be suitable. Membranes with less than or equal to 0.45 microns porosity will prevent passage of cells. Membranes with larger porosity such as 1.2 microns, which will allow passage of a few cells after a time but which will allow better diffusion across it can also be used. Each membrane of different chemistry and structure has its characteristic properties regarding preferential passage of certain molecules, permitted diffusion rate, toxicity, ease of handling, strength, durability in use, clot-forming property, etc., as is well known in this art, and is selected accordingly by one skilled in the art. The membrane will be of such thickness as to allow ready or rapid exchange of molecules, or passage thereof, while preventing the destruction of pancreatic cells by immunological mechanism. The Millipore Filter MF HAW, for instance having a thickness of 150 microns, is advantageous for use herein. However, other membranes of different thickness, e.g., as low as 30 microns, can be used, so long as they exhibit suitable permeability and adequate strength for installation in the arrangement employed. The first membrane is advantageously treated to decrease or prevent clot formation on the blood-contacting surface thereof in the manner well-known to the art.

The second membrane, in contact with the dialysis liquid, is of such type as to allow passage of molecules of less size than protein molecules. It prevents the loss of pancreatic cells into the dialysis fluid and prevents massive protein loss from blood into the dialysate liquid. Suitably, such second membrane allows optimum passage of smaller-than-protein molecules with different shape and electrical charge, such as the various electrolytes mentioned above. One very advantageous membrane for use as the second membrane is Cuprophane used in artificial kidneys which has a thickness of 25 microns. Other membranes can be employed as second membranes so long as they exhibit the desired predetermined permeability and adequate strength. Other types of membrane such as those made of Silastic may be found to be suitable. The membrane is selected by those skilled in the art to exhibit its known preferential passage of the molecules, proper lack of toxicity, its strength, ease of handling and durability in use, for instance.

Permeability of the above-described membranes, as is known, does not depend on a single physical property such as thickness or porosity, but is a characteristic affected by such property or by a chemical property such as limited mutual solubility with the material to be passed therethrough, or by both such properties. Therefore, the membranes are selected according to known or pre-determined permeability to the components in question. However, where porosity is a determining factor, pores of not over 0.45 microns are selected to prevent the passage of cells, whereas proteins and the molecules described herein will pass through pores of not over 0.45 microns.

The dialysate liquid will vary in its composition, depending upon the animal being treated and its particular needs. Such aqueous dialysis fluids are available in commerce. So as not to inhibit insulin secretion by the pancreatic islet cells, the glucose concentration in the dialysate liquid should be at least 100 mg. percent.

The pancreatic islet cell layer can be prepared, if desired, by preparing an "instant" confluent or superconfluent mono-layer, using tissue culture techniques well known to those skilled in the art, on either membrane prior to their assembly into the trilaminate structure described and shown herein, from a fresh aqueous suspension of pancreatic islet cells, i.e., once dispersed cells. such suspension can be made by the method of S. Moskalewski, in Gen. Comp. Endoc. 5: 342 (1965) or the method of C. Hellerstrom (1964) Acta Endocrinol. 45:122 in combination with other tissue dissociation methods known to those skilled in the art such as that of A. Moscona. By the term "instant" it is meant that a membrane is treated with or placed in contact with a suspension of the living cells at a high concentration, and a mono-layer is then formed by cell attachment to the membrane, producing a confluent or superconfluent mono-layer promptly. A confluent mono-layer is a layer completely covering the membrane to a depth of one cell, but it will be understood that a minor portion of the surface of the membrane can be covered with a layer of more than one cell in depth; and in a superconfluent mono-layer, such covering is two or more cells in depth. These terms and procedures are well known in the art. If a confluent layer is produced in the usual fashion, starting with a suspension of $2.5 \times 10^5$ cells per cc., of pancreatic islet cells, there occurs an undesirable change in the ratio of epithelial cells: fibroblast cells in the monolayer, from that found in vivo. Fibroblast cells selectively proliferate faster than epithelial cells. It is particularly advantageous, therefore, to employ a confluent or superconfluent mono-layer for two reasons: First, to allow for maximum treatment per surface area, and second, to discourage proliferation of fibroblasts as well as de-differentiation of epithelial cells. The depth of the pancreatic cell layer is advantageously the thickness of one cell layer, for optimum exchange with both the blood and the dialysate as well as for discouraging de-differentiation. However, it is not essential to employ a mono-layer, so long as the cell layer permits diffusion between the membranes as described herein. In place of normal pancreatic islet cells, one can also use benign insulinoma cells from a patient. A mono-layer of insulinoma cells can be formed from lower cell concentrations, e.g., of $5.10^5$ cells/cc., by conventional methods.

The device of the present invention comprises at least one treatment unit having a first semi-permeable membrane, means to introduce a body fluid into contact with the first membrane, a layer of living pancreatic islet cells disposed on the side of the membrane opposite to the body fluid, means to maintain the body fluid and the pancreatic cells out of contact with each other, and means to withdraw the body fluid from contact with such membrane. In a preferred embodiment, the device comprises at least one treatment unit having a first semi-permeable membrane, a second semi-permeable membrane, means to introduce a body fluid into contact with the first membrane, means to introduce a dialysate liquid into contact with the second membrane, a layer of living pancreatic islet cells disposed between such membranes, means to maintain the body fluid and the liquid and the pancreatic cells out of contact with each other and means to withdraw the body fluid and the liquid separately from contact with such membranes. Advantageously, the device includes a plurality of such hepatification units assembled in one jacket or housing.

BRIEF DESCRIPTION OF THE DRAWINGS

The invention will be illustrated and explained by the written description and by the annexed drawings which show some embodiments of the device of this invention and wherein.

DETAILED DESCRIPTION OF THE INVENTION

Figure 1:
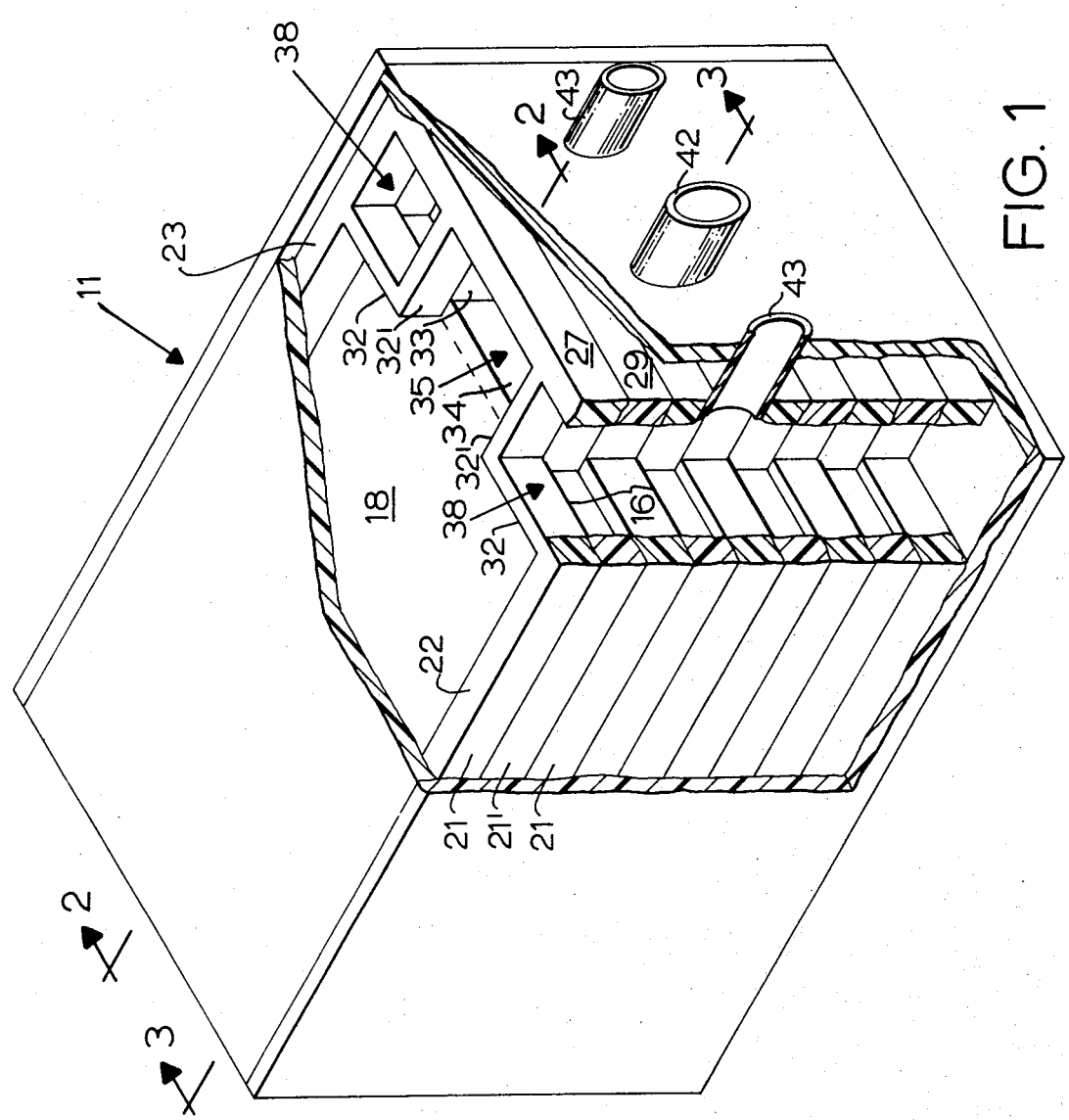
FIG. 1 is a perspective view, partially cut away, of one embodiment of a device or apparatus according to the invention.
Figure 2:
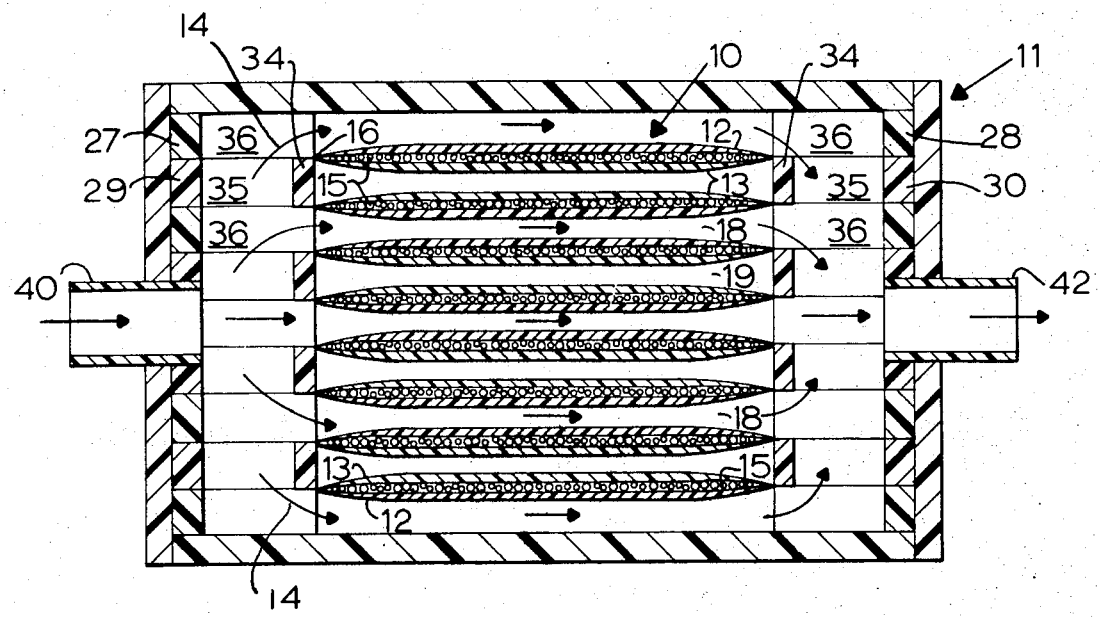
FIG. 2 is a vertical sectional view taken on line 2—2 of FIG. 1 and showing typical flow of blood in this embodiment.
Figure 3:
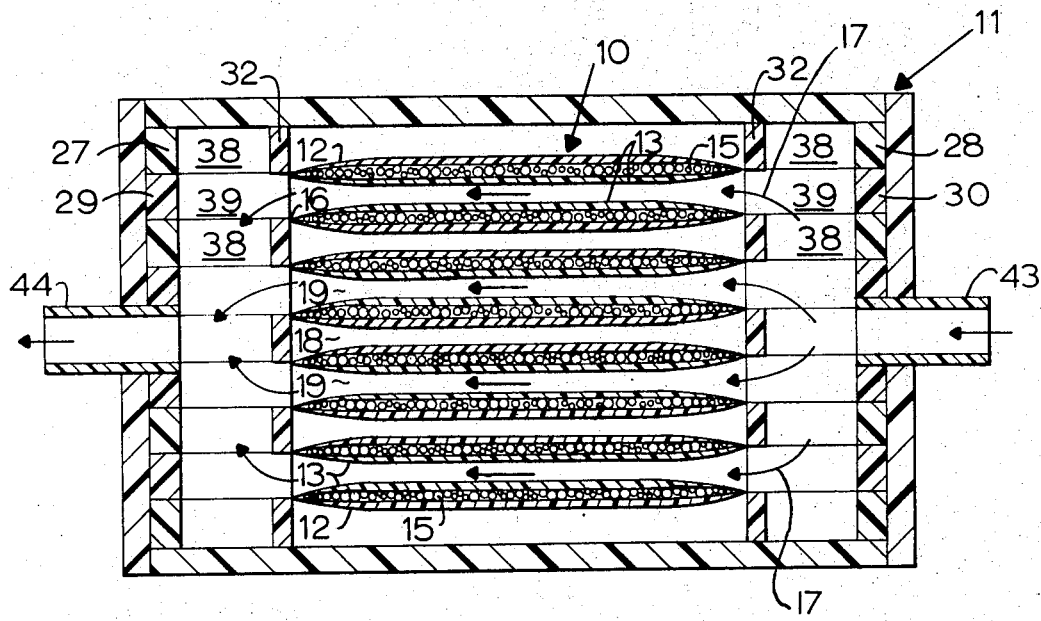
FIG. 3 is a vertical sectional view taken on line 3—3 of FIG. 1 and showing typical flow of dialysis liquid in that embodiment.
Figure 4:
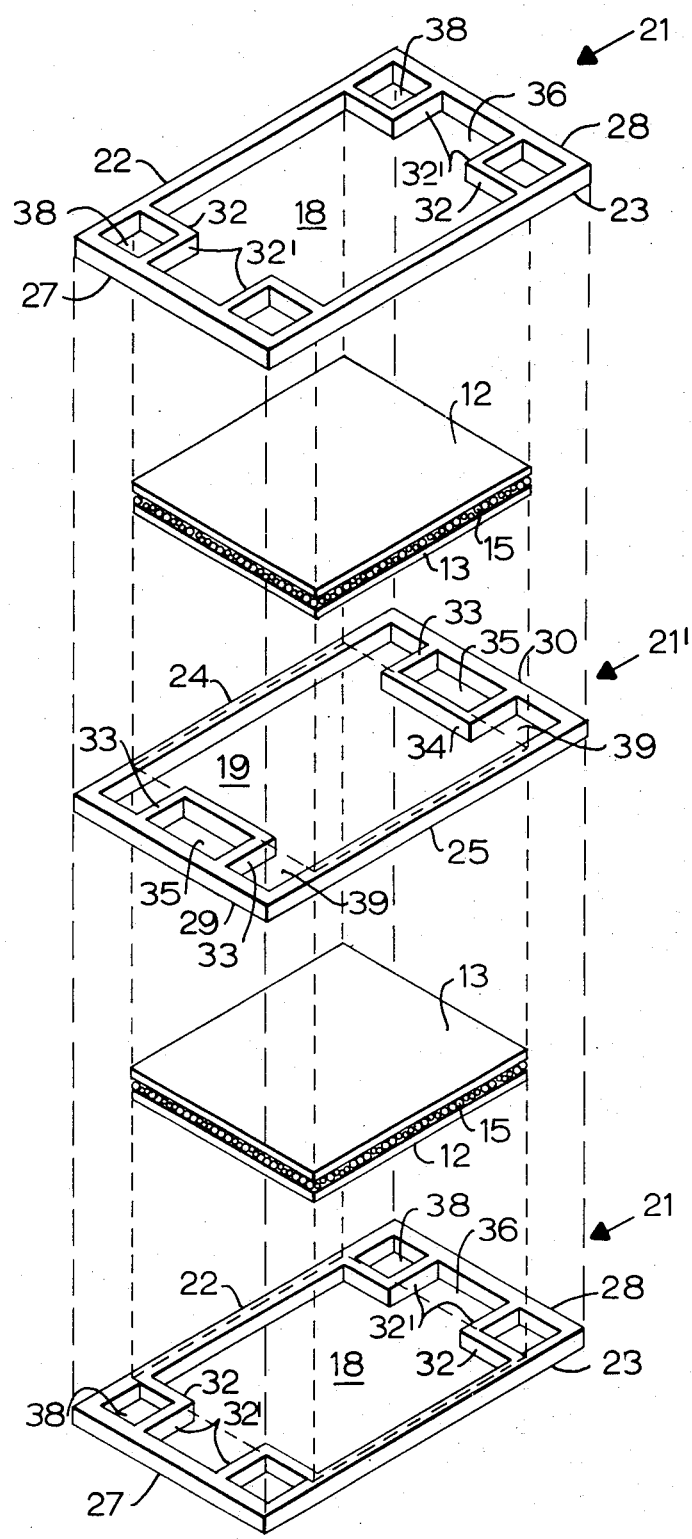
FIG. 4 is an exploded view of one embodiment of a treatment unit.

There is shown in FIGS. 1 – 4 an assembly of treatment units 10, within a housing 11. Each unit 10 comprises a first semipermeable membrane 12 adapted to be in contact with the blood when introduced into the device, and a second semi-permeable membrane 13 adapted to lie in contact with dialysate liquid when the latter flows through the device. Between membranes 12 and 13 is disposed layer 15 of pancreatic islet cells. Membranes 12 and 13 are sealed together at the ends and sides, as illustrated at 16, suitably by means of silastic glue, to enclose the pancreatic cells layer 15. As shown in FIGS. 2 and 3, in this embodiment, units 10 lie in alternately reversed positions with respect to the first and second membranes, i.e., in adjacent units like membranes are adjacent or face each other, whereby a path 18 is formed, e.g., of a pair of like membranes, for the passage of blood; and a path 19, of a pair of like membranes 13, for passage of dialysate liquid.

Flow of the fluids through such passages is restricted also and directed by frames 21, 21' which provide the side walls 22, 23, 24 and 25 of such passages; and the end walls 27, 28, 29 and 30 thereof. Extending inwardly from side walls 22, and 23, adjacent their juncture are dividing walls 32'; and extending inwardly from end walls 29 and 30 in frame 21' are dividing walls 33 extending generally perpendicularly to walls 29 and 30, and walls 34, generally parallel to walls 29 and 30, to form an enclosed area 35. Area or aperture 35 adjoins with space 36 in frame 21, when assembled, to form an entrance or exit passageway or reservoir for blood, conducting it to passage 18. Similarly, apertures 38 framed by walls 32, 32' in frame 21, mate with areas or apertures 39 in frame 21', when assembled, to form a conduit or passageway or reservoir to conduct dialysate liquid to passages 19, at one end of the device and to withdraw it at the other end, similarly to the above arrangement for conducting blood to and from the treatment units. A suitable inlet conduit 40 and outlet conduit 42, are provided to enable introduction and withdrawal of the body fluid such as blood; and conduits 43 and 44, respectively, enable introduction and withdrawal of the dialysate liquid, to flow countercurrent to the flow of blood. Flow can be effected concurrently, but it is advantageous to carry it out countercurrently. Frames 21 and the housing may be made of Silastic, Lucite or other material compatible with body fluids and are preferably treated to prevent clotting effect on blood. The method can also be operated with cell treatment and dialysis of the blood accomplished simultaneously or in series.

I claim:

1. A semipermeable membrane and means associated therewith for positioning body fluid to be treated into contact with one side of said membrane; and
    once dispersed live pancreatic islet cells located proximate the opposite side of said membrane and out of direct contact with said body fluid.
2. Apparatus of claim 1 wherein said membrane is permeable to molecules smaller than said cells.
3. Apparatus of claim 1 wherein the said cells are disposed in a layer having a thickness of about one cell.
4. Apparatus of claim 1 wherein the said membrane is of membrane type filter material.
5. Apparatus of claim 1 wherein the said cells are disposed in a confluent-superconfluent monolayer.
6. Apparatus of claim 1, and
    a second semipermeable membrane having one side juxtaposed to said first named membrane and containing said cells therebetween; and
    means positioning dialysate liquid onto the opposite side of said second membrane and out of direct contact with said cells and body fluid.
7. Apparatus of claim 6:
    wherein the said first named membrane is permeable to molecules smaller than said cells; and
    said second named membrane is permeable to molecules smaller than protein molecules.
8. Method of treating body fluid comprising:
    positioning of said fluid to be treated into contact with one side of a semipermeable membrane; and positioning of once dispersed live pancreatic islet cells proximate the opposite side of said membrane.
9. Method of claim 8 wherein the said membrane is permeable to molecules smaller than said cells.
10. Method of claim 8, and
    positioning of one side of a second semipermeable membrane in juxtaposition to said first membrane for containing said cells therebetween; and
    positioning dialysate liquid on the opposite side of said second membrane and out of direct contact with said cells and body fluid.
11. Method of claim 10:
    wherein the said first named membrane is permeable to molecules smaller than said cells; and
    said second named membrane is permeable to molecules smaller than protein molecules.
12. Method of claim 8, and
    dialyzing said fluid across a second semipermeable membrane with a dialysis liquid.

* * * * *